Dec. 25, 1923.
E. A. HAWTHORNE ET AL
AUTOMOBILE MIRRORSCOPE BRACKET
Filed April 13, 1922
1,478,826
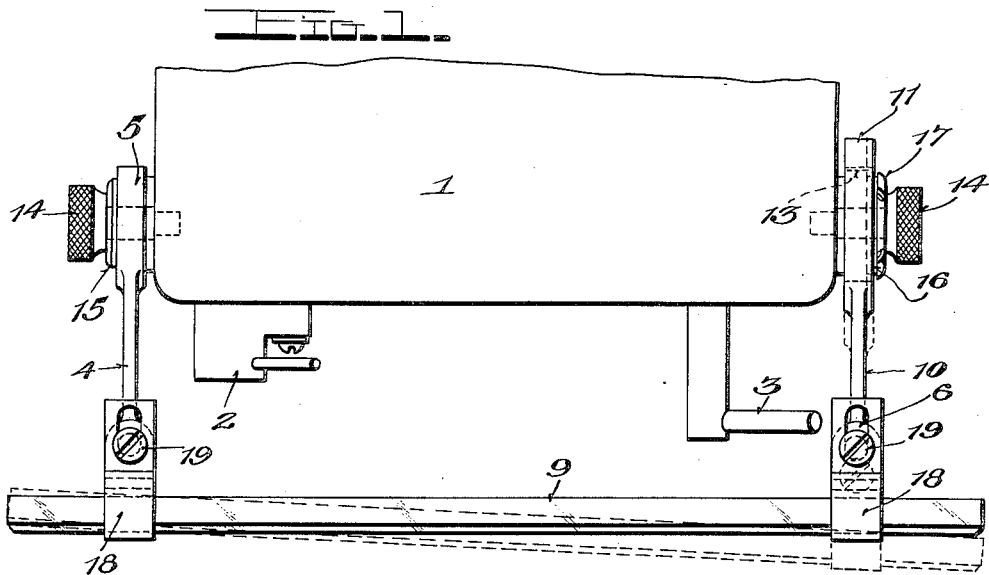
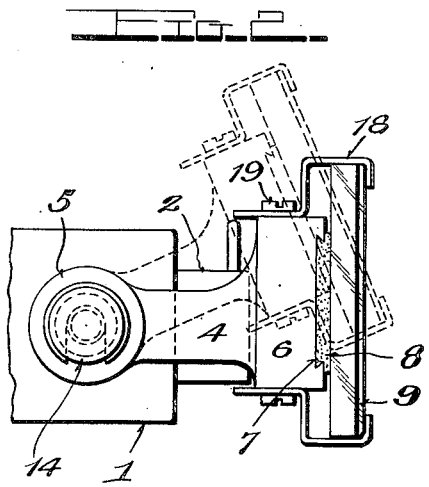 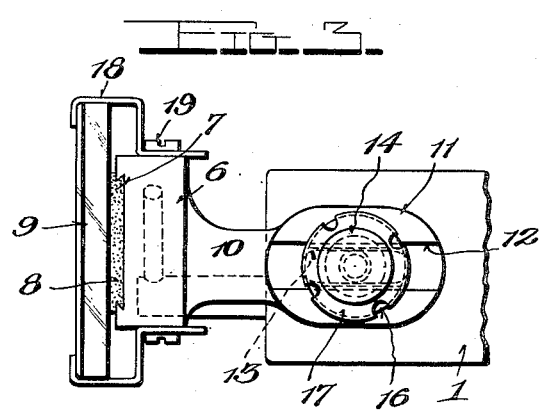
 
 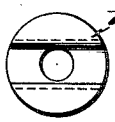
Inventors
E. A. Hawthorne
E. S. Hawthorne
By *[signature]*
Attorney Patented Dec. 25, 1923.

1,478,826

UNITED STATES PATENT OFFICE.

ELLSWORTH A. HAWTHORNE AND ELLSWORTH S. HAWTHORNE, OF BRIDGEPORT, CONNECTICUT; SAID ELLSWORTH S. HAWTHORNE ASSIGNOR TO SAID ELLSWORTH A. HAWTHORNE.

AUTOMOBILE MIRRORSCOPE BRACKET.

Application filed April 13, 1922. Serial No. 552,294.

*To all whom it may concern:*

Be it known that we, ELLSWORTH A. HAWTHORNE and ELLSWORTH S. HAWTHORNE, both citizens of the United States, and residing at the city of Bridgeport, in the county of Fairfield and State of Connecticut, have invented certain new and useful Improvements in Automobile Mirrorscope Brackets; and we do declare the following to be a full, clear, and exact description of the invention, such as will enable others skilled in the art to which it appertains to make and use the same.

This invention relates to certain new and useful improvements in a mirror bracket and it has for one of its objects to provide adjustable clamping means for accommodating mirrors of varying widths or thicknesses within certain limits.

Another object of the invention is to provide a pair of bracket members one of which is formed with an alongated slot to enable adjustability thereof and the consequent canting or disposing of the supported mirror at an angle whereby the driver is permitted to view properly the traffic conditions in the rear of his automobile.

The improved mirror bracket is especially adapted for closed cars wherein mirrors of rectangular oblong shape are mounted on top of the windshields, but obviously the bracket is serviceable on open cars although mirrors on these cars are usually mounted on a front mud guard or to the side of the windshield. Windshield wipers are now extensively used, being attached to the top molding of the windshield in just the position the mirror should occupy.

The invention further resides in the provision of a structure for supporting a mirror from the casing of a windshield wiper in a manner for being moved from its normal position to render the switch or hand crank of the windshield wiper accessible and also in the provision of spring and channel washers with clamping set screws so that the proper tension may be placed on the brackets for securing them against being jarred loose from a set or adjusted position.

Further, the invention resides in the features of construction and the arrangements and combinations of parts hereinafter described and claimed, reference being made to the accompanying drawings, wherein:

Figure 1, is a top plan view of the improved mirror bracket attached to the casing of a windshield wiper which is fragmentarily shown;

Figure 2, is an elevation thereof viewing the same from the left end;

Figure 3, is a similar view of the right end thereof;

Figure 4, is a detail view depicting the spring washer used on the left bracket member; and Figure 5, is a like view of the channeled washer used on the right bracket member.

Referring more in detail to the drawing, the casing of a windshield wiper is shown at 1, the same being equipped with a control switch 2 and a crank 3, automatically operated, or by an operating handle if manually controlled.

The improved mirror support consists of two bracket members, the left member embodying an arm 4 provided with a circular bearing 5 at one end and an enlarged, mirror-supporting head 6 at the opposite end, the outer face of the head being formed with a transverse, dovetailed groove 7 in which is secured a cushioning pad 8 of felt against which the mirror 9 seats. The right bracket member consists of an arm 10 having an elongated slotted bearing 11 at one end and its opposite end formed with a head 6 having a groove 7 and cushioning pad 8 similar to bracket member 4. The elongated bearing 11 is also provided on its outer side with a groove 12 alined with the slot 13. A set screw 14 is passed through each bearing and threaded into the opposite end walls of the wiper casing 1. To provide for the necessary friction in the pivotal mountings of the bracket members, a U-shaped spring washer 15 is interposed between the bearing 4 and the head of its set screw 14, and a channeled washer 16 and spring washer 17 are interposed between the bearing 11 and the head of its set screw, the rib of the channeled washer fitting in the groove 12 of bearing 11. This construction provides for easy adjustment of the mirror and the swinging of the same to and from its normal position in front of the wiper casing.

The mirror is secured to the cushioned seats or faces of the heads 6 by means of clamps 18 of substantially U-form which embrace the upper and lower edges of the mirror and each of which is provided with a rearward arm overlying the upper and lower faces of the heads 6 and slotted to receive the set screws 19 for securing the clamps in position.

The spring washers 15 and 17, the latter being radially slotted to increase its resiliency, afford an effective frictional grip for holding the mirror at a set adjustment either operative or inoperative so that the mirror may readily be moved from in front of the wiper casing to permit access to the latter and then as quickly restored to its operative position and there be firmly held against being jarred loose.

The slotted bracket member permits the tilting or adjustment of one end of the mirror to dispose the latter at the proper inclination for reflecting to the driver the conditions of traffic at the rear. The mirror clamps, through their adjustment, will accommodate mirrors of different thickness within certain limits as defined by their slots receiving the screws 19. Thus, it will be observed that a mirror bracket is provided capable of according the mirror either bodily adjustment or angular adjustment as well as one adapted for receiving mirrors of different thicknesses.

What is claimed is:

1. In a mirror support, a pair of bracket members having mirror supporting heads at one end, means to secure the opposite ends of the bracket members to a support, said heads having relatively long vertical outer faces and spaced upper and lower seats, a cushioning pad secured to the outer face of each head, a mirror engaged with the pad and having its top and bottom edges projecting above and below the top and bottom seats of the heads, clamps having slotted horizontal parts engaged with the respective seats of the heads and having substantially U-shaped parts engaged with the front face of the mirror, and independent screws projected through the slots of the clamps and into the seats of the head for independently and adjustably securing the respective clamps to the heads and for enabling removal of the mirror by operation of but one screw of each clamp.

2. In a mirror support a pair of bracket members having mirror supporting heads at one end, means to secure the opposite ends of the bracket members to a support, said heads having relatively long vertical outer faces and spaced upper and lower seats, a cushioning pad secured to the outer face of each head, a mirror engaged with the pad, independent clamps having slotted parts engaged with the respective seats of the heads and having parts engaged with the front face of the mirror, and independent screws projected through the slots of the clamps and into the seats of the heads for independently and adjustably securing the respective clamps to the heads and for enabling removal of the mirror by operation of but one screw of each clamp.

In testimony whereof we affix our signatures hereto.

ELLSWORTH A. HAWTHORNE.
ELLSWORTH S. HAWTHORNE.